United States Patent [19]

Ezis

[11] 4,443,394

[45] Apr. 17, 1984

[54] METHOD OF MAKING A SILICON NITRIDE BODY FROM THE $Y_2O_3/SIO_2/SI_3N_4/AL_2O_3$

[75] Inventor: Andre Ezis, Grosse Ile, Mich.

[73] Assignee: Ford Motor Company, Dearborn, Mich.

[21] Appl. No.: 527,641

[22] PCT Filed: Jul. 19, 1983

[86] PCT No.: PCT/US83/01110

§ 371 Date: Jul. 19, 1983

§ 102(e) Date: Jul. 19, 1983

[51] Int. Cl.³ .............................................. C04B 35/50
[52] U.S. Cl. ...................................... 264/65; 501/97; 264/66
[58] Field of Search ....................... 264/65, 66; 501/97

[56] References Cited

U.S. PATENT DOCUMENTS

| | | | |
|---|---|---|---|
| 3,969,125 | 7/1976 | Komeya | 264/63 |
| 4,264,548 | 4/1981 | Ezis | 264/65 |
| 4,264,550 | 4/1981 | Ezis | 264/85 |
| 4,285,895 | 8/1981 | Mangels | 264/65 |
| 4,354,990 | 10/1982 | Martininyo | 264/65 |

FOREIGN PATENT DOCUMENTS 2621523 11/1976 Fed. Rep. of Germany ........ 501/97

Primary Examiner—John Parrish
Attorney, Agent, or Firm—Joseph W. Malleck; Olin B. Johnson

[57] ABSTRACT

A method is disclosed of making a fully dense silicon nitride comprising object by heating a silicon nitride mixture containing yttrium silicon oxynitride (at least 75% $Y_{10}Si_6O_{24}N_2$) to full density without the need for special atmospheres or packing mediums. A reaction bonded silicon nitride/yttrium silicon oxynitride comprising object is fabricated to have the oxynitride present in an amount of 5–17% by weight of the object, free silicon and other oxides in an amount up to 0.5%, and the remainder essentially silicon nitride. The object is heated in an ambient atmosphere to a temperature below the sublimation temperature of silicon nitride and for a period of time to fully densify the object as a result of solution of the silicon nitride into liquified oxynitride, the object being in direct contact with the ambient atmosphere during heating.

17 Claims, No Drawings

METHOD OF MAKING A SILICON NITRIDE BODY FROM THE $Y_2O_3/SIO_2/SI_3N_4/AL_2O_3$

TECHNICAL FIELD

The invention relates to the technology of making a heat fused silicon nitride comprising body from the following system: $Si_3N_4$, $SiO_2$, $Y_2O_3$ and $Al_2O_3$.

BACKGROUND OF THE INVENTION AND PRIOR ART STATEMENT

The use of the component system of $Si_3N_4$, $SiO_2$, $Y_2O_3$ and $Al_2O_3$ for making a silicon nitride comprising product is relatively new in the art. Such component system has been processed by hot pressing to obtain a densified product (see U.S. Pat. Nos. 3,969,125; 2,264,550; 4,264,548). But such component system has not been successfully processed to a densified product by sintering.

It is known that it is not possible to sinter the single component of $Si_3N_4$ under ambient conditions. To achieve some degree of satisfactory densification, oxides must be added to the $Si_3N_4$, extremely high temperatures must be employed (above the sublimation point of $Si_3N_4$), and over-pressures as well as blankets must be used to contain the sublimation (see U.S. Pat. No. 4,285,895 by Mangels). This procedure does not achieve optimum economy and efficiency of processing. In an effort to eliminate the necessity for over-pressure during sintering, U.S. Pat. No. 4,354,990 discloses a method by which larger than usual amounts of oxides are added, while still using a packing blanket to contain sublimation at excessively high sintering temperatures. Again, this processing technique lacks economy and efficiency. Neither of these last two patents employ the $Si_3N_4/Y_2O_3/SiO_2/Al_2O_3$ component system (which may afford enhanced strength characteristics) and thus fail to recognize the solubility enhancing characteristics of such system under sintering conditions.

SUMMARY OF THE INVENTION

The invention is a method of making a silicon nitride comprising product by heat fusion without the necessity for special atmospheres or packing mediums which will hinder efficiency.

The method comprises (a) fabricating a unitary, porous, reaction bonded silicon nitride/yttrium silicon oxynitride/alumino-silicate comprising object, the yttrium silicon oxynitride being formed from an $SiO_2$ component and being present in an amount of 5–17% by weight of the object, the silicate being present in an amount of up to 3% by weight of the object; (b) heating the object in an ambient atmosphere to a temperature level below the sublimation temperature of the silicon nitride and for a period of time sufficient to substantially fully densify the object as a result of dissolution of said silicon nitride into liquified yttrium silicon oxynitride. The object is preferably in direct contact with the ambient atmosphere during heating.

It is preferable that the yttrium silicon oxynitride consist of at least 75% of the $Y_{10}Si_6O_{24}N_2$ phase, and that the alumino-silicate is amorphous and resides as a thin coating on the grains of the silicon nitride and yttrium silicon oxynitride. The silicon nitride may have an alpha/beta ratio in the range of 1:10 to 20:1.

The object is preferably fabricated by compacting silicon and reactive oxygen carrying agents under ambient conditions to a density level of about 1.2 gm/cm³, and nitriding the compact to a density level at least 1.9 gm/cm³. The oxygen carrying agents preferably consist essentially of 4–12% $Y_2O_3$, 1–4.0% $SiO_2$ ($SiO_2$ being usually present as a layer on the silicon metal particles), and 0.75–4.0% $Al_2O_3$ (all percentages based on silicon normalized to $Si_3N_4$). The nitriding is preferably carried out in the temperature range of 1090°–1430° C. for a period of time sufficient to (a) form the desired amount of yttrium silicon oxynitride, and (b) provide at least 99.5% conversion of the silicon to silicon nitride.

It is preferable that the fusion heating be carried out at a temperature level of 1650°–1750° C. over a period of time of 0.5–12 hours and without the use of mechanical or gaseous over-pressure. The resulting product will advantageously have a strength level of at least 100,000 psi as measured in a 4-point bend test at room temperature.

It is advantageous if the nitrided object is not cooled as a result of the nitriding step and is subjected directly to increased heating for the sintering step.

BEST MODE FOR CARRYING OUT THE INVENTION

A preferred method for making a silicon nitride comprising object is as follows.

1. Fabricating A Porous, Reaction Bonded Silicon Nitride Comprising Object (a) Forming Powder Mixture To be able to sinter under ambient conditions under the sublimation temperature of $Si_3N_4$, it is necessary that the porous object, prior to sintering, contain yttrium silicon oxynitride, particularly of the $Y_{10}Si_6O_{24}N_2$ phase, and a controlled amount of alumino-silicate. The select yttrium silicon oxynitride promotes greater solubility of $Si_3N_4$ into the bonding liquid formed under sintering conditions at a lower temperature. The alumino-silicate further enhances solubility as well as promoting optimum wear life and oxidation resistance of the product. The alumino-silicate will form a thin coating (i.e., 2–10 angstroms thick) in the densified body on the oxynitride and silicon nitride crystallites which reduces the transport of oxygen so necessary to undesirable linear oxidation kinetics of the crystallites.

To this end, a nitridable mixture is formed of silicon powder, $SiO_2$ (carried with the Si metal), $Y_2O_3$, and $Al_2O_3$. Preferably, the reactive oxygen carrying agents should be used in the following ranges to increase the volume of the $Y_{10}Si_6O_{24}N_2$ phase formed during nitriding, although the generation of the $Y_{10}Si_6O_{24}N_2$ can be obtained outside these ranges as long as temperature and time conditions are appropriate for available ingredients to react and form such phase. Advantageously, $Y_2O_3$ is used in an amount of 6.2–17.8% by weight of the mixture or 4–12% by weight of the mixture normalized to $Si_3N_4$, $Al_2O_3$ in an amount of 0.75–4% (normalized to $Si_3N_4$), and $SiO_2$ in an amount of 1–4.0% of the silicon. Normalizing means the amount present after silicon is converted to $Si_3N_4$. The $SiO_2$ component is essential as a component of the system to form the yttrium silicon oxynitride, thereby, by definition, eliminating the $Y_2O_3/Si_3N_4$ (N-melilite phase); the $SiO_2$ is usually present as an oxide surface coating on the silicon powder grains, but can be added separately if such oxide content is too low or uncontrollable.

For purposes of the preferred method, a uniform powder mixture is prepared with 2000 grams of silicon powder (85.8 weight percent of the total mixture), 278 grams of $Y_2O_3$ (11.9 weight percent of the total mixture, and 53 grams $Al_2O_3$ (2.27 weight percent of the total mixture. The $SiO_2$ content is 2.06% (weight) of the silicon charge and is incorporated as a surface layer (this corresponds to an oxygen content of 1.1%).

Silicon is selected to have 98% or greater purity and a starting average particle size of 2.5-3 microns with no particles or hard agglomerates exceeding 10 microns in size. The major trace metal contaminants experienced with such purity include, as a maximum: Fe—1.0%; Al—0.5%, Mn—0.09%; and Ca—0.02%. Nonmetallic contaminants include, as a maximum: carbon—0.05%, and $O_2$—less than 2.0% (after milling). Yttria is selected to have a purity of at least 99.99% with a surface area greater than 6.3 $m^2/g$ with a crystal size of less than 0.5 microns. Alumina is selected to have a purity of at least 99.5% with an average particle size of 0.2-3 microns with no particle being greater than 10 microns and with a crystal size of 0.3-0.5 microns.

The mixture is comminuted and blended by being charged into an inert milling jar along with grinding media in the form of Burundum cylinders (85% $Al_2O_3$ and 11% $SiO_2$, 2% MgO, 1.2% CaO, 0.8% [$TiO_2$, $Fe_2O_3$, $Na_2O$, $K_2O$] which may add $Al_2O_3$ to the mixture by attrition), milled for 48 hours at 64 rpm, then the mixture is separated from the milling media by use of a #10 mesh screen. The milling is preferably dry, but can be wet, with some accompanying disadvantages. The yttria must be in a reactive form with a high surface area and small crystalline size. The resulting milled/blended mixture will have at least 50% with an average particle size of about 2.0 microns and 90% with an average particle size of less than 8 microns. The oxygen level after milling in air will be increased to 1.5 weight percent of the silicon (before comminution the $O_2$ content was 1.1%), and be present as an oxide coating on the silicon in an amount of about 2.8 weight percent. The ratio of oxygen carrying agent/$SiO_2$ (such as $Y_2O_3/SiO_2$) is controlled to be in the range of 1-12 and preferably about 4.

(b) Compacting

A measured quantity of the milled mixture is loaded into a cold press die arrangement and pressed at ambient conditions by use of 1400-1500 psi to form a round disc compact of a size about 6 inches in diameter by 0.6 inch in thickness, and a green density of approximately 1.4 $gm/cm^3$.

(c) Heating to Nitride

The compact is heated in a nitriding atmosphere without the use of pressure to produce a silicon nitride comprising object consisting of silicon nitride, yttrium silicon oxynitride in an amount of 10-11% by weight of the object, 0.3-3.0% silicate, and up to 0.5% by weight of free silicon and other unreacted oxides. The body will have a size greater than and a density less than the object to be formed.

To carry out the heating, the compact is placed in an enclosed furnace, preferably evacuated to a pressure of less than one micron, and heated at a fast rate (i.e., 500° F./hr (270° C./hr) to 1200° F. (649° C.). The furnace is then filled with a gaseous mixture consisting of 72% nitrogen, 25% helium, and 3% hydrogen, to a pressure of about 2.7 psig. The total $O_2$ and $H_2O$ content in such gaseous mixture is less than 4 ppm. The temperature of the furnace is then increased in steps from 1200° to 1700° F. (1090° C.) at 500° F./hr and then to an initiating nitriding temperature of about 2000° F. (1093° C.) at a slower rate (such as 110° C./hr). The ultimate nitriding temperature is important and is not to exceed 2600° F. (1427° C.) in order to obtain complete conversion of silicon to $Si_3N_4$. The time at nitriding is relatively important for obtaining an increased or optimum amount of the $Y_{10}Si_6O_{24}N_2$ phase; such time has been found to be approximately 200 hours. Fresh nitrogen is intermittently supplied to the furnace to replace the nitrogen consumed in forming silicon nitride and oxynitride. Nitrogen is added when the pressure drops below 2.4 psig and brought back up to a maximum pressure of 2.7 psig. The temperature is held constant while replenishment is taking place, but is increased when the pressure remains above 2.4 psig for a predetermined period of time. When the nitriding cycle is completed, (i.e., the system does not require additional nitrogen) the material may be cooled to room temperature at any rate, preferably 250° F./hr (56° C./hr). However, the cooling can be eliminated and the object subjected immediately to sintering. The time at nitriding is measured from the onset of attaining the initiating nitriding temperature (2000° F.) to the time at which no further nitrogen demand is present.

The nitrided body will consist essentially of silicon nitride (at least 60% of which is typically in the alpha form, but the alpha/beta ratio can vary from 1:10 to 20:1 without affecting the advantages of this invention), 4-17% silicon yttrium oxynitride (at least 75% of which is in the $Y_{10}Si_6O_{24}N_2$ phase and the remainder may be any yttrium silicon oxynitride that is formed from an $SiO_2$ component), and a small portion of an amorphous aluminum containing silicate and up to 0.5% of silicon and unreacted $Y_2O_3$. The body will have a density of at least 2.0 $gm/cm^3$. This body is an intermediate commodity that has independent utility as a starting block for other shaping techniques, one of which is sintering.

(d) Sintering

Without substantially cooling the nitrided body, heating is continued to form a heat fused, fully densified silicon nitride body at an elevated temperature of 1650°-1750° C. (3002°-3182° F.). The sintering heating is carried out for a period of time (preferably 5-12 hours) to substantially fully density the nitrided body and form a product of required dimension and density. The heating must be carried out at a temperature level effective to sinter, but without sublimation of the silicon nitride (under 1760° C. (3200° F.)). The heating is carried out in an ambient atmosphere without the use of mechanical or atmospheric over-pressure, or by the use of a blanket of a ceramic packing medium such as loose silicon nitride powder.

For purposes of the preferred embodiment, the nitrided object was heated at a rate of about 600° C. per hour to a temperature level of 1750° C. (3182° F.) and held at this temperature for four hours. The resulting product contained substantially beta $Si_3N_4$, 11% of a yttrium silicon oxynitride, and approximately 3% alumino-silicate. The product possessed an average strength (room temperature) of 100,000 psi in a 4-point bend test.

EXAMPLES

A series of silicon nitride comprising objects were prepared, sintered, and tested, principally as to strength, to illustrate how variations in the processing and chemistry facilitate or deny obtaining the advantages of this invention. The results are summarized in Table 1.

All of the samples were fabricated by (a) mixing silicon (carrying a surface oxide of about 2.8% $SiO_2$, weight percent of the silicon), $Y_2O_3$, and sometimes $Al_2O_3$; (b) compacting the mixture to above 1.9 gm/cm$^3$; (c) nitriding the object at an upper limit temperature of 2500° F. (1404° C.) to obtain a nitrided object with the indicated amount of the $Y_{10}Si_6O_{24}N_2$ phase; and (d) the object was sintered at the indicated temperature and time, and sometimes use of over-pressure. The resulting processed samples were tested as to strength.

Samples 1, 4, 6, 7, 8, 13 and 14 were carried out according to the teaching of this invention and the associated resulting strength level was satisfactory. Samples 2, 5 and 10 contained insufficient $Al_2O_3$ to form the necessary small amount of alumino-silicate to facilitate solution of $Si_3N_4$ into the oxynitride liquid during sintering.

Samples 3, 11 and 12 were processed at too high a sintering temperature, thus allowing the $Si_3N_4$ to sublimate and cause a reduction in strength. Sample 9 was nitrided for too short a nitriding time (under 120 hours), where all the other samples were nitrided for at least 200 hours. Sample 14 was sintered for an undesirable length of time, creating a density and strength gradient in the final product due to surface volatilization; the portion of the product used to make the MOR bar was taken from the core of the product and thus exhibited a satisfactory strength level. However, if the MOR bar was taken from the surface, the strength level would be unsatisfactory.

period of time effective to substantially full densify the object as a result of the solution of said silicon nitride into liquified yttrium silicon oxynitride.

2. The method as in claim 1, in which said object may contain free silicon and other oxides up to 0.5% by weight of the object, and said heating is carried out in direct contact with the ambient atmosphere.

3. The method as in claim 1, in which said yttrium silicon oxynitride consists of at least 75% of the $Y_{10}Si_6O_{24}N_2$ phase.

4. The method as in claim 1, in which said alumino-silicate is amorphous and resides as a thin coating on the grains of said silicon nitride and yttrium silicon oxynitride.

5. The method as in claim 1, in which said heating is carried out to a temperature in the range of 1650°–1750° C. (3002°–3182° F.).

6. The method as in claim 5, in which the heating is carried out at said temperature for a period of 0.5–12 hours.

7. The method as in claim 1, in which said object is fabricated by compacting silicon and reactive oxygen carrying agents under ambient conditions, and nitriding the compact to a density level of at least 1.9 gm/cm$^3$.

8. The method as in claim 7, in which said oxygen carrying agents consist essentially of 4–12% $Y_2O_3$, 1–4.0% $SiO_2$, and 0.75–4.0% and $Al_2O_3$, said percentages being calculated with reference to the silicon as normalized to $Si_3N_4$.

9. The method as in claim 8, in which said nitriding is carried out in the temperature range of 1093°–1426° C. (2000°–2600° F.) for a period of time sufficient to form the desired amount of yttrium silicon oxynitride.

TABLE 1

| Sample | Certain Mixture Components Used to Prepare Nitrided Object (wt. % normalized for $Si_3N_4$) $Y_2O_3$ | $Al_2O_3$ | % $Y_{10}$ Phase of Oxynitride in Nitrided Object | Sintering Temperature (°C.) | Use of Over Pressure Atmosphere (two steps: 30 psi/1500 psi) | Sintering Time (hours) | Average Strength At Or Above 100,000 psi (70 kg/mm$^2$) |
|---|---|---|---|---|---|---|---|
| 1 | 4 | 3 | 90 | 1750 | No | 8 | Yes |
| 2 | 7.9 | 0 | 85 | " | " | 12 | No |
| 3 | " | 3 | 80 | 1800 | " | .5 | " |
| 4 | 12.0 | 2 | 98 | 1750 | " | 12 | Yes |
| 5 | 5 | 0 | 77 | " | " | 6 | No |
| 6 | 10 | 3 | 99 | 1700 | " | " | Yes |
| 7 | 7.9 | 1.5 | 85 | 1730 | " | " | " |
| 8 | " | 2.0 | 87 | " | " | 4 | " |
| 9 | " | " | 20 | " | " | " | No |
| 10 | " | .5 | 85 | 1750 | " | 6 | " |
| 11 | " | 1.5 | " | 1775 | Yes | 8 | " |
| 12 | " | 2.0 | 78 | " | " | " | " |
| 13 | " | 3.0 | 88 | 1730 | No | 4 | Yes |
| 14 | " | 1.0 | 80 | 1700 | " | 20 | Yes |

I claim:

1. A method of making a silicon nitride comprising product, by the steps of:
   (a) fabricating a unitary, porous, reaction bonded object comprising silicon nitride, yttrium silicon oxynitride, and alumino-silicate, said yttrium silicon oxynitride being chemically formed from an $SiO_2$ component and being present in an amount of 5–17% by weight of said object, said alumino-silicate being present in an amount up to 3% by weight of the object; and
   (b) heating said object in an ambient atmosphere, without the use of mechanical or gaseous overpressure to a temperature level below the sublimation temperature of said silicon nitride and for a 10. The method as in claim 1, in which said fabricated unitary object has an alpha/beta ratio of the silicon nitride in the range of 1:10 to 20:1.

11. The method as in claim 1, in which the resulting product has an average strength level of at least 100,000 psi (70 kg/mm$^2$) in a 4-point bend test at room temperature.

12. A method of making a densified silicon nitride object, comprising:
   (a) heating a generally homogeneous mixture of powder silicon and reactive oxygen carrying agents in a nitriding atmosphere without the use of pressure normally associated with hot pressing and at a nitriding temperature level of 1093°–1427° C.

(2000°–2600° F.) to produce a unitary silicon nitride comprising body consisting essentially of silicon nitride, yttrium silicon oxynitride of the type having an $SiO_2$ component, said body having a size greater than and a density less than the object to be formed; and (b) without substantially cooling said nitrided body, continuing to heat said unitary silicon nitride comprising body to a temperature level effective to sinter said body without sublimation of the silicon nitride, said heating being carried out in an ambient atmosphere without the use of mechanical or gaseous overpressure, for a period of time to substantially fully densify said body to a substantially sintered beta silicon nitride comprising object of required dimension and density.

13. The method as in claim 12, in which said nitride heating is carried out for a period of at least 200 hours.

14. The method as in claim 12, in which said heating of step (b) is carried out by said body being directly exposed to said atmosphere without being surrounded by ceramic packing medium.

15. The method as in claim 12, in which the temperature level of heating in step (b) is carried out at a level of 1650°–1750° C. (3002°–3182° F.).

16. The method as in claim 12, in which said powder silicon and reactive oxygen carrying agents are cold compacted prior to heating in the nitriding step to a density level of about 1.2 gm/cm$^3$.

17. The method as in claim 12, in which said yttrium silicon oxynitride is devoid of the $Y_2O_3/Si_3N_4$ phase.

* * * * *